(12) United States Patent
Wang et al.

(10) Patent No.: US 11,574,327 B2
(45) Date of Patent: Feb. 7, 2023

(54) METHOD, SYSTEM, AND COMPUTER PROGRAM PRODUCT FOR DETERMINING CUSTOMER MIGRATION

(71) Applicant: Visa International Service Association, San Francisco, CA (US)

(72) Inventors: Peiwen Wang, Singapore (SG); Roan Joy Halili Cuares, Singapore (SG); Pattakarn Gultawatvichai, Bangkok (TH); Dhirender Singh Rathore, Singapore (SG); Keyuan Wu, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/718,383

(22) Filed: Dec. 18, 2019

(65) Prior Publication Data

US 2021/0192548 A1      Jun. 24, 2021

(51) Int. Cl.
*G06Q 30/02* (2012.01)
*G06N 3/02* (2006.01)
*G06K 9/62* (2022.01)

(52) U.S. Cl.
CPC ....... *G06Q 30/0204* (2013.01); *G06K 9/6223* (2013.01); *G06N 3/02* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 10,346,869 B1* | 7/2019 | Ahmed | G06Q 30/0226 |
| 2012/0330714 A1* | 12/2012 | Malaviya | G06Q 40/06 705/7.29 |
| 2015/0278813 A1* | 10/2015 | Yue | G06Q 20/389 705/44 |
| 2017/0259177 A1* | 9/2017 | Aghdaie | A63F 13/35 |
| 2018/0322394 A1* | 11/2018 | Nguyen | G06N 3/04 |
| 2019/0147469 A1* | 5/2019 | Hu | G06Q 30/0205 705/7.34 |
| 2019/0236608 A1* | 8/2019 | Formsma | G06Q 20/4016 |
| 2019/0295087 A1* | 9/2019 | Jia | H04L 67/22 |
| 2020/0082811 A1* | 3/2020 | Yadav | G10L 15/005 |
| 2020/0167817 A1* | 5/2020 | Ishikawa | G06Q 30/0224 |
| 2020/0184487 A1* | 6/2020 | Pandya | G06N 20/00 |
| 2020/0349169 A1* | 11/2020 | Venkatesan | G06N 20/00 |
| 2021/0035121 A1* | 2/2021 | Neuweg | G06Q 20/227 |

* cited by examiner

*Primary Examiner* — Alan Torrico-Lopez
(74) *Attorney, Agent, or Firm* — The Webb Law Firm

(57) ABSTRACT

A method, system, and computer program product for determining customer migration: obtain first feature data for a plurality of users associated with a first time period; segment the plurality of users into a plurality of groups based on the first feature data; identify a center point of each group based on the feature data; obtain second feature data for one or more users of the plurality of users associated with a second time period; determine a distance between the one or more users and each center point of each group based on the second feature data; and assign the one or more users to a group of the plurality of groups based on the distance between the one or more users and each center point of each group.

14 Claims, 5 Drawing Sheets

METHOD, SYSTEM, AND COMPUTER PROGRAM PRODUCT FOR DETERMINING CUSTOMER MIGRATION

BACKGROUND

1. Field

This disclosure relates generally to systems, devices, products, apparatus, and methods that are used for identifying customer segments, and in some embodiments or aspects, to a method, a system, and a product for determining customer spending migration across segments.

2. Technical Considerations

Issuers or banks may aim to identify which customer segments or groups in a market are changing (e.g., the fastest growing customer segments or groups, etc.). However, there is no connection between customers in a segment or group for a first time period to a segment or group for a second time period (e.g., there is no customer connection between year-to-year customer segments or groups, etc.). For example, comparison of a segment or group for a first time period to a segment or group for a second time period may provide very different customer groupings that cannot be used to identify which customer segments or groups are changing over time. Accordingly, there is a need in the art for improved customer migration determination.

SUMMARY

Accordingly, provided are improved systems, devices, products, apparatus, and/or methods for determining customer migration.

According to some non-limiting embodiments or aspects, provided is a computer-implemented method, including: obtaining, with at least one processor, first feature data for a plurality of users associated with a first time period; segmenting, with at least one processor, the plurality of users into a plurality of groups based on the first feature data; identifying, with at least one processor, a center point of each group based on the feature data; obtaining, with at least one processor, second feature data for one or more users of the plurality of users associated with a second time period; determining, with at least one processor, a distance between the one or more users and each center point of each group based on the second feature data; and assigning, with at least one processor, the one or more users to a group of the plurality of groups based on the distance between the one or more users and each center point of each group.

In some non-limiting embodiments or aspects, the method further includes: receiving, with at least one processor, transaction data associated with a transaction between a merchant and the one or more users; and modifying, with at least one processor, during processing of the transaction, the transaction based on the group of the plurality of groups to which the one or more users is assigned.

In some non-limiting embodiments or aspects, the method further includes: applying, with at least one processor, an auto encoder neural network to the first feature data to reduce a number of dimensions of the first feature data; and applying, with at least one processor, the auto encoder neural network to the second feature data to reduce a number of dimension of the second feature data to a same number of dimension as the reduced first feature data.

In some non-limiting embodiments or aspects, segmenting the plurality of users into the plurality of groups based on the first feature data comprises applying k-means clustering to the first feature data.

In some non-limiting embodiments or aspects, a number of segments into which the plurality of users is to be segmented is a predetermined number of segments.

In some non-limiting embodiments or aspects, the first time period is a first year, wherein the second time period is a second year, and wherein the second year is before the first year.

In some non-limiting embodiments or aspects, each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

According to some non-limiting embodiments or aspects, provided is a computing system including: one or more processors programmed and/or configured to: obtain first feature data for a plurality of users associated with a first time period; segment the plurality of users into a plurality of groups based on the first feature data; identify a center point of each group based on the feature data; obtain second feature data for one or more users of the plurality of users associated with a second time period; determine a distance between the one or more users and each center point of each group based on the second feature data; and assign the one or more users to a group of the plurality of groups based on the distance between the one or more users and each center point of each group.

In some non-limiting embodiments or aspects, the one or more processors are further programmed and/or configured to: receive transaction data associated with a transaction between a merchant and the one or more users; and modify during processing of the transaction, the transaction based on the group of the plurality of groups to which the one or more users is assigned.

In some non-limiting embodiments or aspects, the one or more processors are further programmed and/or configured to: apply an auto encoder neural network to the first feature data to reduce a number of dimensions of the first feature data; and apply the auto encoder neural network to the second feature data to reduce a number of dimension of the second feature data to a same number of dimension as the reduced first feature data.

In some non-limiting embodiments or aspects, the plurality of users is segmented into the plurality of groups based on the first feature data by applying k-means clustering to the first feature data In some non-limiting embodiments or aspects, a number of segments into which the plurality of users is to be segmented is a predetermined number of segments.

In some non-limiting embodiments or aspects, the first time period is a first year, wherein the second time period is a second year, and wherein the second year is before the first year.

In some non-limiting embodiments or aspects, each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

According to some non-limiting embodiments or aspects, provided is a computer program product including at least one non-transitory computer-readable medium including program instructions that, when executed by at least one processor, cause the at least one processor to: obtain first feature data for a plurality of users associated with a first time period; segment the plurality of users into a plurality of groups based on the first feature data; identify a center point of each group based on the feature data; obtain second feature data for one or more users of the plurality of users associated with a second time period; determine a distance between the one or more users and each center point of each group based on the second feature data; and assign the one or more users to a group of the plurality of groups based on the distance between the one or more users and each center point of each group.

In some non-limiting embodiments or aspects, the instructions further cause the at least one processor to: receive transaction data associated with a transaction between a merchant and the one or more users; and modify during processing of the transaction, the transaction based on the group of the plurality of groups to which the one or more users is assigned.

In some non-limiting embodiments or aspects, the instructions further cause the at least one processor to: apply an auto encoder neural network to the first feature data to reduce a number of dimensions of the first feature data; and apply the auto encoder neural network to the second feature data to reduce a number of dimension of the second feature data to a same number of dimension as the reduced first feature data.

In some non-limiting embodiments or aspects, the plurality of users is segmented into the plurality of groups based on the first feature data by applying k-means clustering to the first feature data.

In some non-limiting embodiments or aspects, the first time period is a first year, wherein the second time period is a second year, and wherein the second year is before the first year.

In some non-limiting embodiments or aspects, each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

Further embodiments or aspects are set forth in the following numbered clauses:

Clause 1. A computer-implemented method comprising: obtaining, with at least one processor, first feature data for a plurality of users associated with a first time period; segmenting, with at least one processor, the plurality of users into a plurality of groups based on the first feature data; identifying, with at least one processor, a center point of each group based on the feature data; obtaining, with at least one processor, second feature data for one or more users of the plurality of users associated with a second time period; determining, with at least one processor, a distance between the one or more users and each center point of each group based on the second feature data; and assigning, with at least one processor, the one or more users to a group of the plurality of groups based on the distance between the one or more users and each center point of each group.

Clause 2. The method of clause 1, further comprising: receiving, with at least one processor, transaction data associated with a transaction between a merchant and the one or more users; and modifying, with at least one processor, during processing of the transaction, the transaction based on the group of the plurality of groups to which the one or more users is assigned.

Clause 3. The method of any of clauses 1 or 2, further comprising: applying, with at least one processor, an auto encoder neural network to the first feature data to reduce a number of dimensions of the first feature data; and applying, with at least one processor, the auto encoder neural network to the second feature data to reduce a number of dimension of the second feature data to a same number of dimension as the reduced first feature data.

Clause 4. The method of any of clauses 1-3, wherein segmenting the plurality of users into the plurality of groups based on the first feature data comprises applying k-means clustering to the first feature data.

Clause 5. The method of any of clauses 1-4, wherein a number of segments into which the plurality of users is to be segmented is a predetermined number of segments.

Clause 6. The method of any of clauses 1-5, wherein the first time period is a first year, wherein the second time period is a second year, and wherein the second year is before the first year.

Clause 7. The method of any of clauses 1-6, wherein each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

Clause 8. A computing system comprising: one or more processors programmed and/or configured to: obtain first feature data for a plurality of users associated with a first time period; segment the plurality of users into a plurality of groups based on the first feature data; identify a center point of each group based on the feature data; obtain second feature data for one or more users of the plurality of users associated with a second time period; determine a distance between the one or more users and each center point of each group based on the second feature data; and assign the one or more users to a group of the plurality of groups based on the distance between the one or more users and each center point of each group.

Clause 9. The computing system of clause 8, wherein the one or more processors are further programmed and/or configured to: receive transaction data associated with a transaction between a merchant and the one or more users; and modify during processing of the transaction, the transaction based on the group of the plurality of groups to which the one or more users is assigned.

Clause 10. The computing system of any of clauses 8 or 9, wherein the one or more processors are further programmed and/or configured to: apply an auto encoder neural network to the first feature data to reduce a number of dimensions of the first feature data; and apply the auto encoder neural network to the second feature data to reduce a number of dimension of the second feature data to a same number of dimension as the reduced first feature data.

Clause 11. The computing system of any of clauses 8-10, wherein the plurality of users is segmented into the plurality of groups based on the first feature data by applying k-means clustering to the first feature data.

Clause 12. The computing system of any of clauses 8-11, wherein a number of segments into which the plurality of users is to be segmented is a predetermined number of segments.

Clause 13. The computing system of any of clauses 8-12, wherein the first time period is a first year, wherein the second time period is a second year, and wherein the second year is before the first year.

Clause 14. The computing system of any of clauses 8-13, wherein each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

Clause 15. A computer program product comprising at least one non-transitory computer-readable medium including program instructions that, when executed by at least one processor, cause the at least one processor to: obtain first feature data for a plurality of users associated with a first time period; segment the plurality of users into a plurality of groups based on the first feature data; identify a center point of each group based on the feature data; obtain second feature data for one or more users of the plurality of users associated with a second time period; determine a distance between the one or more users and each center point of each group based on the second feature data; and assign the one or more users to a group of the plurality of groups based on the distance between the one or more users and each center point of each group.

Clause 16. The computer program product of clause 15, wherein the instructions further cause the at least one processor to: receive transaction data associated with a transaction between a merchant and the one or more users; and modify during processing of the transaction, the transaction based on the group of the plurality of groups to which the one or more users is assigned.

Clause 17. The computer program product of any of clauses 15 or 16, wherein the instructions further cause the at least one processor to: apply an auto encoder neural network to the first feature data to reduce a number of dimensions of the first feature data; and apply the auto encoder neural network to the second feature data to reduce a number of dimension of the second feature data to a same number of dimension as the reduced first feature data.

Clause 18. The computer program product of any of clauses 15-17, wherein the plurality of users is segmented into the plurality of groups based on the first feature data by applying k-means clustering to the first feature data.

Clause 19. The computer program product of any of clauses 15-18, wherein the first time period is a first year, wherein the second time period is a second year, and wherein the second year is before the first year.

Clause 20. The computer program product of any of clauses 15-19, wherein each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

Figure 1:
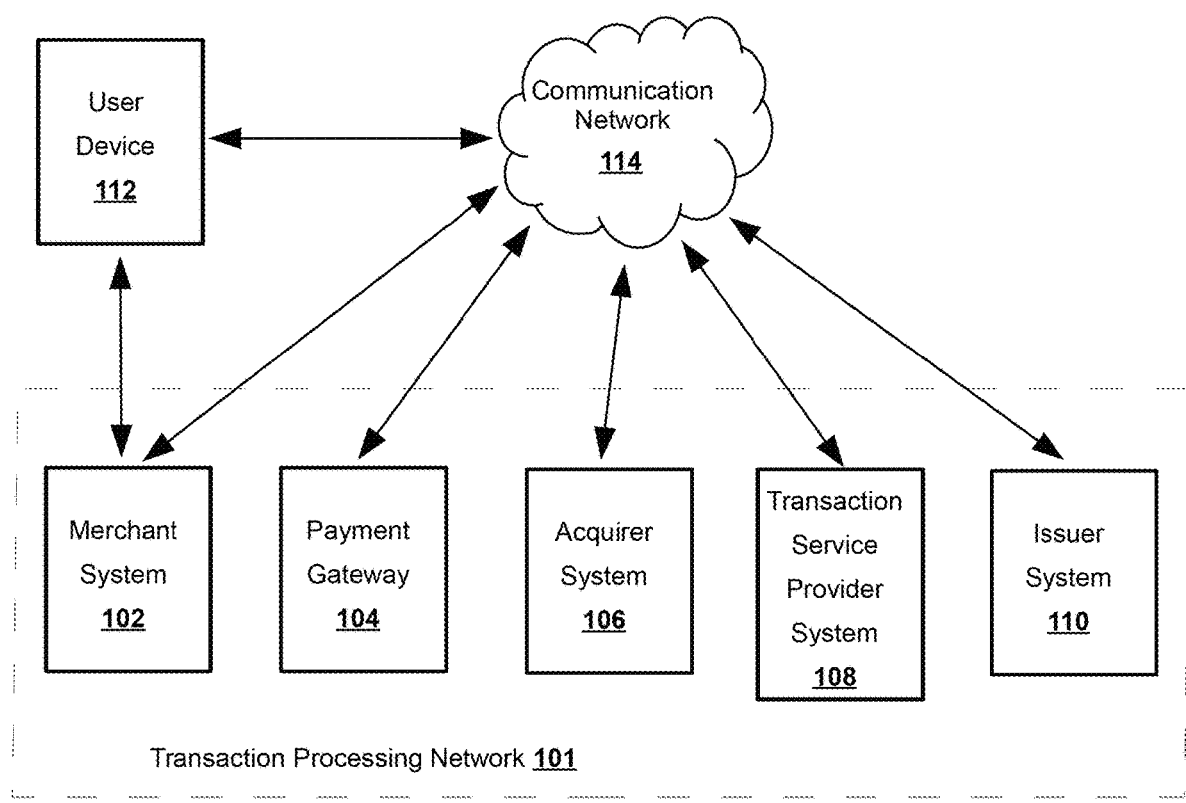
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Provided are improved systems, devices, products, apparatus, and/or methods for determining customer migration.

Non-limiting embodiments or aspects of the present disclosure are directed to systems, methods, and computer program products for determining customer migration that obtain first feature data for a plurality of users (e.g., users, customers, cardholders, etc.) associated with a first time period; segment the plurality of users into a plurality of groups based on the first feature data; identify a center point of each group based on the feature data; obtain second feature data for one or more users of the plurality of users associated with a second time period; determine a distance between the one or more users and each center point of each group based on the second feature data; and assign the one or more users to a group of the plurality of groups based on the distance between the one or more users and each center point of each group. In this way, non-limiting embodiments or aspects of the present disclosure provide for a connection between customers in a segment or group for a first time period to a segment or group for a second time period (e.g., a customer connection between year-to-year customer segments or groups, etc.). Accordingly, customer groupings may be used to identify which customer segments or groups are changing over time, which enables detecting a trend in transactions of a customer or cardholder for use in real-time modification of transactions during processing of the transactions to account for the customer movement or migration.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, and/or issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 114, etc.) and/or communicating information and/or data to payment gateway system 104, acquirer system 106, transaction service provider system 108, issuer system 110, and/or user device 112 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 (e.g., via communication network 114, etc.) and/or communicating information and/or data to merchant system 102, acquirer system 106, transaction service provider system 108, issuer system 110, and/or user device 112 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 114, etc.) and/or communicating information and/or data to merchant system 102, payment gateway system 104, acquirer system 106, issuer system 110, and/or user device 112 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including transaction data, and/or the like.

Issuer system 110 may include one or more devices capable of receiving information and/or data from merchant system 102, payment gateway system 104, acquirer system 106, transaction service provider system 108, and/or user device 112 (e.g., via communication network 114, etc.) and/or communicating information and/or data to merchant system 102, payment gateway system 104, acquirer system 106, transaction service provider system 108, and/or user device 112 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 114, etc.) and/or communicating information and/or data to merchant system 102, payment gateway system 104, acquirer system 106, transaction service provider system 108, and/or issuer system 110 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, a peer-to-peer payment transfer application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices or systems of environment 100.

Figure 2:
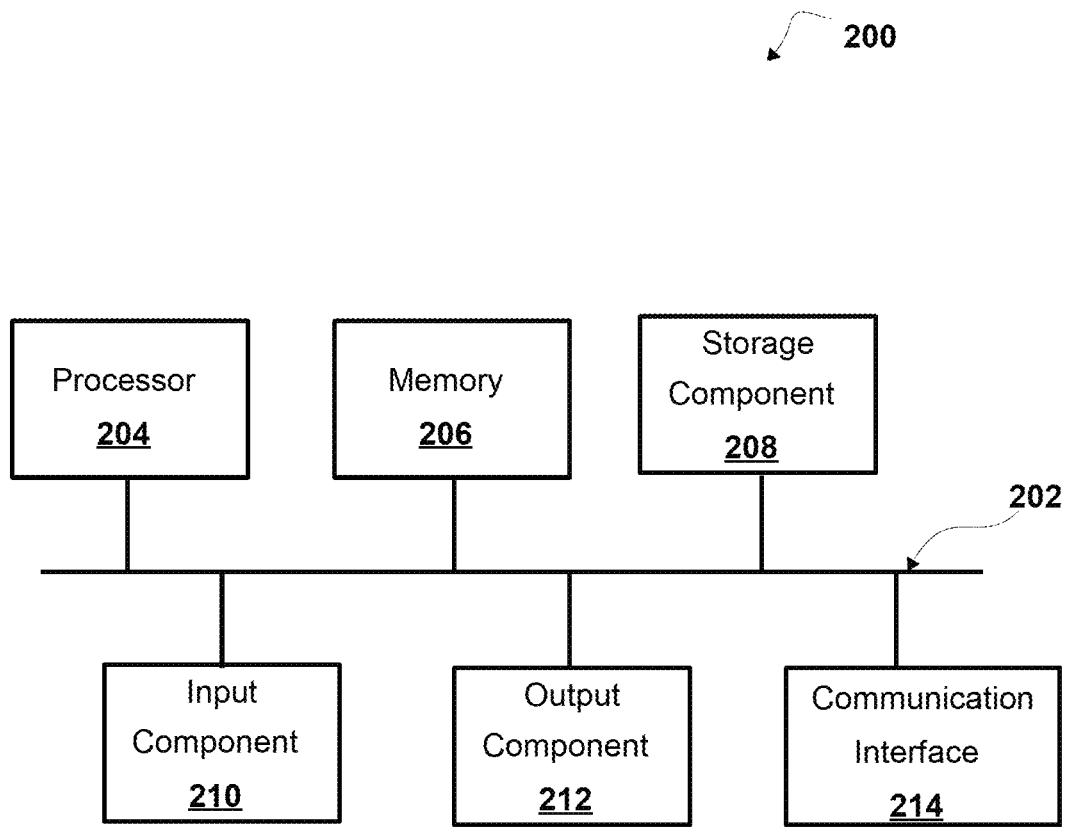
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114. In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.), and/or the like.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
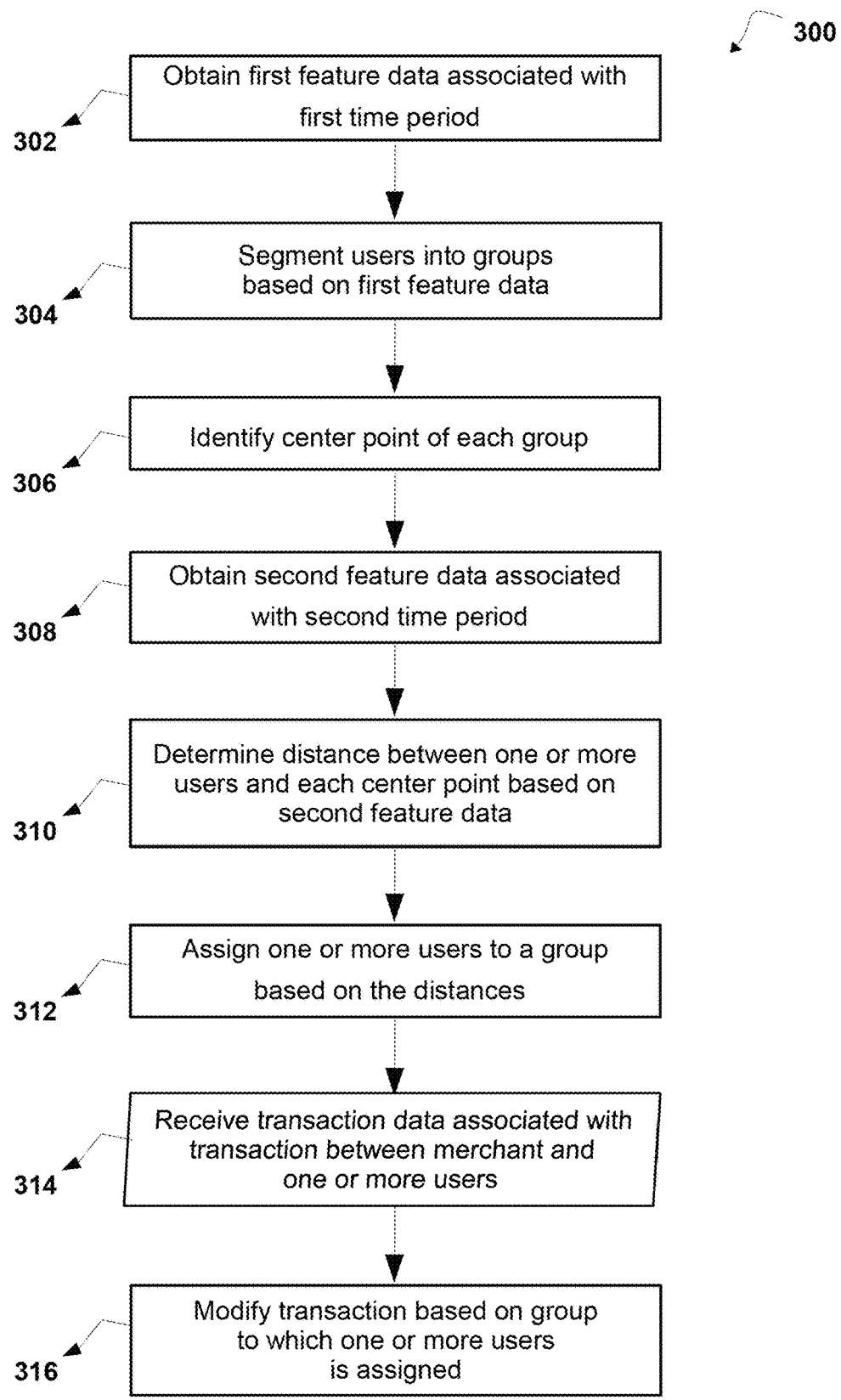
FIG. 3 is a flowchart of non-limiting embodiments or aspects of a process for determining customer migration.

Referring now to FIG. 3, FIG. 3 is a flowchart of non-limiting embodiments or aspects of a process 300 for determining customer migration. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes obtaining first feature data associated with a first time period. For example, transaction service provider system 108 may obtain first feature data for a plurality of users associated with a first time period.

In some non-limiting embodiments or aspects, feature data may include transaction data. In some non-limiting embodiments or aspects, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, and/or the like. In some non-limiting embodiments or aspects, feature data may include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof. In some non-limiting embodiments or aspects, feature data may include one or more of the following transaction data categories: amount of cash withdrawals using the portable financial device (e.g., ATM withdrawals), date and time of each cash withdrawals using the portable financial device, days since last transaction, location of each cash withdrawal using the portable financial device, average international ticket size, date and time of each international purchase, location of each international purchase, merchant of each international purchase, goods or services bought for each international purchase, increase in amount of withdrawals (growth momentum of ticket size) over a given period (e.g., a month, a year, etc.), number of days since last portable financial device transaction, number of months in which cash was withdrawn using the portable financial device over a given period, number of consecutive months in which cash was withdrawn using the portable financial device over a given period (e.g., withdrawal consistency), portable financial device type (e.g., type of credit/debit card), the overall number of transactions using the portable financial device, the number of domestic transactions using the portable financial device, increase in amount of spending (e.g., growth momentum of monthly spending) over a given period (e.g., a month, a year, etc.), amount spent in each portable financial device transaction, date and time of each portable financial device transaction, merchant involved in each portable financial device transaction, goods and services bought and price of each good or service bought in each portable financial device transaction, category of goods and services bought in each portable financial device transaction, number of market categories active, number of market categories active over a given period, number of supermarket transactions over a given period, amount spent in supermarket transactions over a given period, amount spent at restaurants over a given period, number of restaurant transactions over a given period, amount spent at gas stations over a given period, number of gas station transactions over a given period, amount spent at entertainment merchants over a given period, number of entertainment transactions over a given period, amount spent at automotive merchants over a given period, number of automotive transactions over a given period, amount spent at clothing merchants over a given period, number of clothing transactions over a given period, amount spent on luxury goods over a given period, number of luxury good transactions over a given period, or number of transactions and amount spent for other specific goods or services found to be relevant for projecting an account holder's propensity to more frequently use their portable financial device, number of cash advances using the portable financial device over a given period, amount of cash advances using the portable financial device, credit score, credit score history, and other similar or related metrics regarding use of the portable financial device by the user, customer or cardholder.

In some non-limiting embodiments or aspects, transaction service provider system 108 may apply an auto encoder neural network to the first feature data to reduce a number of dimensions of the first feature data. For example, transaction service provider system 108 may apply an auto encoder neural network as described in U.S. Provisional Patent Application No. 62/783,306, filed on Dec. 21, 2018, and assigned to the Assignee of the present disclosure, the entire contents of which are hereby incorporated by reference in their entirety.

As shown in FIG. 3, at step 304, process 300 includes segmenting users into groups based on first feature data. For example, transaction service provider system 108 may segment the plurality of users into a plurality of groups based on the first feature data.

In some non-limiting embodiments or aspects, segmenting the plurality of users into the plurality of groups based on the first feature data comprises applying k-means clustering to the first feature data. For example, the segmenting may include a statistical model, e.g., that uses k-means clustering, to classify users, cardholders or customers into 'K' homogeneous clusters or segments. The first feature data may be input variables for the model. The model outputs a mapping of users, cardholders or customers to groups, clusters or segments that ranges from 0 through 'K−1' clusters or segments, with segment transaction metrics associated with each cluster or segment.

Inputs to the k-means clustering are a number of clusters K, which can be predetermined or determined by the elbow method as described herein, and a data set, which is a collection of features for each data point, i.e., the first feature data for each user, cardholder or customer. The k-means clustering starts with initial estimates for K centroids, which can either be randomly generated or randomly selected from the data set. Each centroid defines one of the K clusters. The algorithm then iterates between two steps: a data assignment step and a centroid update step.

In the data assignment step, each data point, e.g., user, customer or cardholder, is assigned to its nearest centroid, based on the squared Euclidean distance of its first feature data. More formally, if $c_i$ is the collection of centroids in set C, then each data point x is assigned to a cluster based on the following Equation (2):

$$\operatorname*{argmin}_{c_i \in C} dist(c_i, x)^2 \qquad (2)$$

where dist(•) is the standard ($L_2$) Euclidean distance.

The set of data point assignments for each $i^{th}$ cluster centroid can be Si. In the centroid update step, the centroids are recomputed by taking the mean of all data points assigned to that centroid's cluster according to the following Equation (3):

$$c_i = \frac{1}{|s_i|} \sum_{x_i \in s_i} x_i \qquad (3)$$

The k-means clustering iterates between the data assignment step and the centroid update step until a stopping criteria is met (e.g., no data points change clusters, the sum of the distances is minimized, or some maximum number of iterations is reached) to find the clusters/segments and data set labels for the number of clusters K.

In some non-limiting embodiments or aspects, each user, customer or cardholder is assigned to only one segment. In other non-limiting embodiments or aspects, there may be overlap in users, customers or cardholders in the segments.

In some non-limiting embodiments or aspects, a number of segments into which the plurality of users is segmented is a predetermined number of segments (e.g., six segments or clusters, etc.). For example, a number of segments into which the plurality of users is segmented may include a luxury spender segment, a practical affluent spender segment, a well-planned spender segment, an essentialist spender segment, a budget traveler spender segment, and an everyday, everywhere spender segment. In some non-limiting embodiments or aspects, a number of segments into which the plurality of users is segmented may be determined based on an elbow method, wherein the elbow method determines a percentage of variance between the first feature data as a function of the number of optimal segments, and wherein the optimal number of segments is identified in response to a determination that adding an additional segment to the optimal number of segments does not indicate an incremental variance in the first feature data. The elbow method analyzes the percentage of variance explained as a function of the number of segments, e.g., the percentage of variance between the first feature data explained or indicated as a function of the number of segments, wherein the optimal number of segments is chosen so that adding another cluster or segment doesn't give significantly better modeling of the data, e.g., does not help to explain or indicate any incremental variance in the data. More precisely, if the percentage of variance explained by the segments is plotted against the number of segments, the first segments add significant information (explains or indicates a larger amount of variance), but at some point the marginal gain drops, giving an angle in the graph. The number of segments is chosen at this point, hence the "elbow criterion". However, it will be appreciated that the optimal number of segments may be determined using any other method for determining the number of clusters/segments in a data set, such as x-means clustering, information criteria methods, information theoretic methods, the Silhouette methods, cross-validation, and the like.

As shown in FIG. 3, at step 306, process 300 includes identifying a center point of each group. For example, transaction service provider system 108 may identify a center point of each group based on the feature data. As an example, transaction service provider system 108 may identify a center point of each segment by calculating the average of each reduced feature of that segment.

As shown in FIG. 3, at step 308, process 300 includes obtaining second feature data associated with a second time period. For example, transaction service provider system 108 may obtain second feature data for one or more users of the plurality of users associated with a second time period.

In some non-limiting embodiments or aspects, the second time period is after the first time period. For example, the first time period may be a first year (e.g., 2018, etc.) and the second time period may be a second year (e.g., 2019, etc.) after the first year.

In some non-limiting embodiments or aspects, transaction service provider system 108 may apply auto encoder neural network to the second feature data to reduce a number of dimension of the second feature data to a same number of dimension as the reduced first feature data. For example, transaction service provider system 108 may apply an auto encoder neural network as described in U.S. Provisional Patent Application No. 62/783,306, filed on Dec. 21, 2018, and assigned to the Assignee of the present disclosure, the entire contents of which are hereby incorporated by reference in their entirety.

As shown in FIG. 3, at step 310, process 300 includes determining a distance between one or more users and each center point based on second feature data. For example, transaction service provider system 108 may determine a distance between the one or more users and each center point of each group based on the second feature data. As an example, transaction service provider system 108 may determine a Euclidean distance between the reduced second feature data of the one or more users and each center point of each segment or group.

Figure 4:
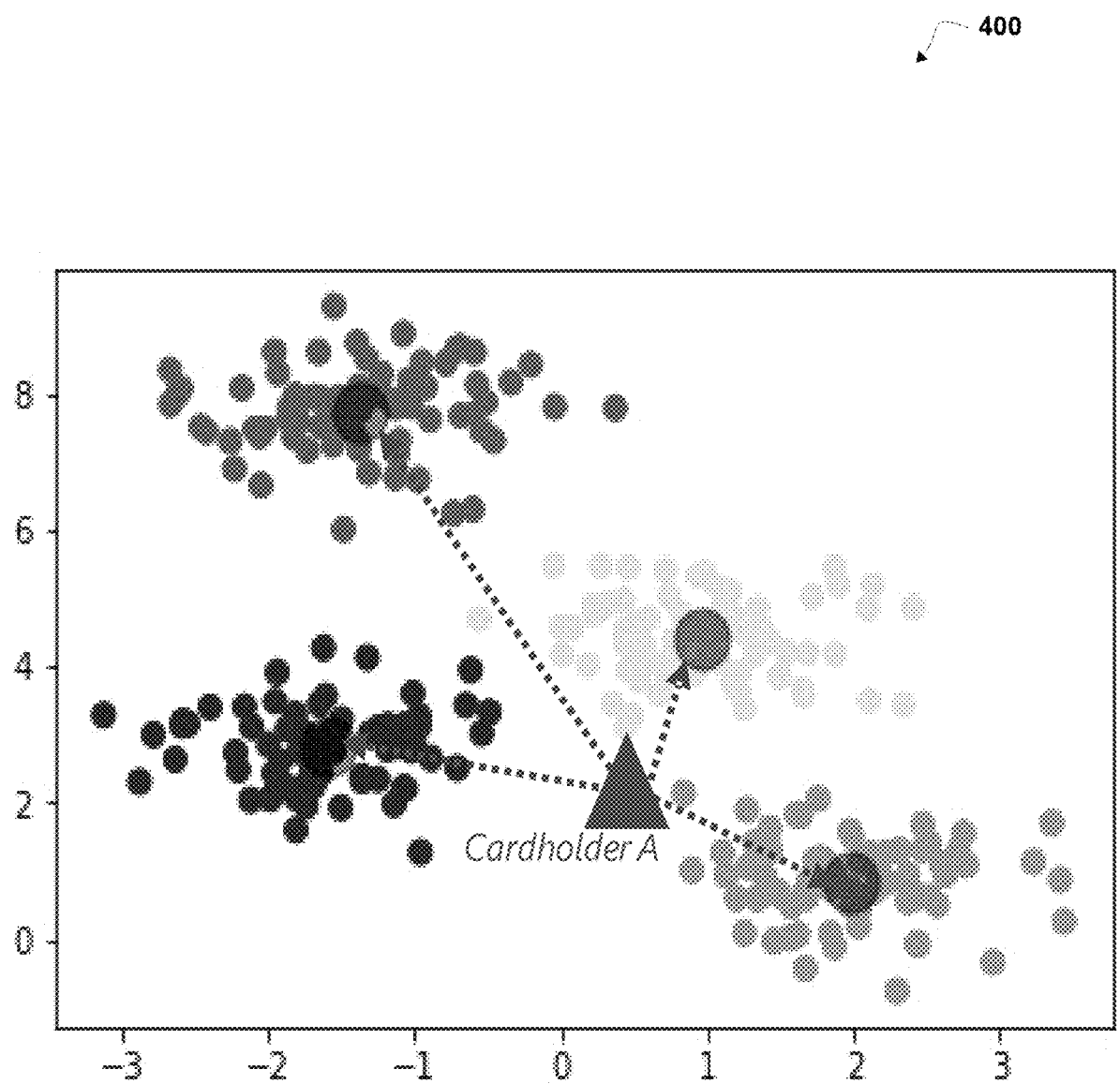
FIG. 4 is a graph.

As shown in FIG. 3, at step 312, process 300 includes assigning one or more users to a group based on distances. For example, transaction service provider system 108 may assign the one or more users to a group of the plurality of groups based on the distance between the one or more users and each center point of each group. As an example, transaction service provider system 108 may assign the one or more users to a group of the plurality of groups with the shortest distance between the one or more users and each center point of each group. For example, and referring also to FIG. 4, FIG. 4 is a graph 400 of cluster distributions representing example groups or segments in a first time period. As an example, each point may include spending features of a cardholder, and each circle may represent a center point of a cluster. In such an example, the triangle may represent spending features of a cardholder A in a second time period before the first time period, and the dotted lines may represent Euclidean distances between the cardholder A and each center point of each group or segment. As an example, cardholder A may be assigned to the group, cluster or segment that is the shortest distance from the cardholder A.

Figure 5:
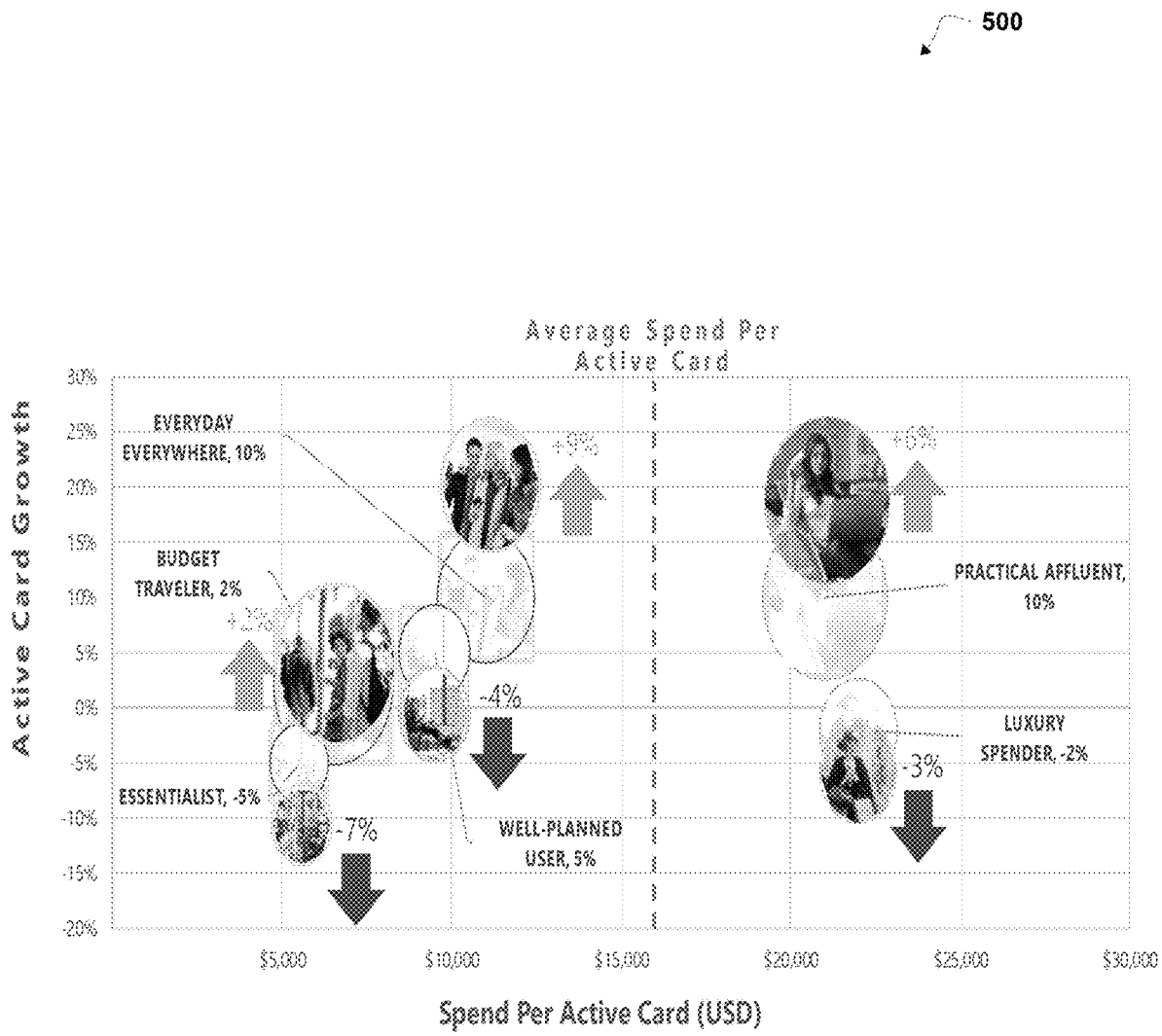
FIG. 5 is a graph.

In some non-limiting embodiments or aspects, transaction service provider system 108 may profile the group distribution with respect to newly-active card personas and dormant cards to determine market movement between the first time period and the second time period. For example, and referring also to FIG. 5, FIG. 5 is a graph 500 showing example movement of cardholders across a predetermined number of segments including a luxury spender segment, a practical affluent spender segment, a well-planned spender segment, an essentialist spender segment, a budget traveler spender segment, and an everyday, everywhere spender segment, from a first year to a second year immediately after the first year.

As shown in FIG. 3, at step 314, process 300 includes receiving transaction data associated with a transaction between a merchant and one or more users. For example, transaction service provider system 108 may receive transaction data associated with a transaction between a merchant and the one or more users.

As shown in FIG. 3, at step 316, process 300 includes modifying a transaction based on a group to which one or more users is assigned. For example, transaction service provider system 108 may modify, during processing of the transaction, the transaction based on the group of the plurality of groups to which the one or more users is assigned. As an example, transaction service provider system 108 may perform a conversion action or a fraud deterrence action. For example, a conversion action may be performed by transaction service provider system 108 to automatically enroll the user in at least one incentive program. As an example, transaction service provider system 108 may detect a trend in one or more transactions associated with the user that indicate that the user is moving toward a different group or segment and, in response to the determination, perform a real-time conversion action during processing of the one or more transactions in transaction processing network 101. The conversion action may be performed by transaction service provider system 108 to automatically update information associated with the user in a database to indicate that the user (e.g., an account associated with the user, etc.) is enrolled in the at least one incentive program and/or update. The conversion action may be performed by transaction service provider system 108 by automatically transmitting the account associated with the user to the merchant system 102 to incentivize, educate, or encourage the user of the at least one account to more frequently use their portable financial device. The conversion action may be performed by transactions service provider system 108 by automatically transmitting a communication to user device 112 of the user to incentivize, educate, or encourage the user to more frequently use their portable financial device.

In another example, a fraud deterrence action may be performed by transaction service provider system 108 to automatically suspend, in response to detecting fraudulent activity, at least one of a transaction activity of the account and access of the account to a system. The fraud deterrence action may be performed by transaction service provider system 108 to automatically transmit information associated with the account to a database (e.g., a transaction service provider database, an issuer database, etc.) to flag the account as associated with fraudulent activity and/or to suspend a transaction activity and/or access of the account to transaction service provider system 108, issuer system 110, or a subsystem thereof. The fraud deterrence action may be performed by transaction service provider system 108 by automatically transmitting the account to merchant system 102 to notify the merchant that the at least one account is now associated with fraudulent activity and/or to cancel the one or more transactions attempted with merchant system 102 by the account. The fraud deterrence action may be performed by transaction service provider system 108 by automatically transmitting a communication to user device 112 of the user 100 of the account.

Accordingly, customer groupings may be used to identify which customer segments or groups are changing over time, which enables detecting a trend in transactions of a customer or cardholder for use in real-time modification of transactions during processing of the transactions to account for the customer movement or migration.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
   obtaining, with at least one processor in a transaction service provider system in a transaction processing network, first feature data for a plurality of users, wherein the first feature data is associated with a first time period;
   applying, with the at least one processor, an auto encoder neural network to the first feature data to reduce a number of dimensions of the first feature data;
   segmenting, with the at least one processor, the plurality of users into a plurality of groups based on only the first feature data including the reduced number of dimensions;
   identifying, with the at least one processor, a center point of each group that was segmented based on only the first feature data;
   obtaining, with the at least one processor, second feature data for one or more users of the plurality of users, wherein the second feature data is associated with a second time period entirely after the first time period;
   applying, with the at least one processor, the auto encoder neural network to the second feature data to reduce a number of dimensions of the second feature data to a same number of dimensions as the reduced first feature data;
   determining, with the at least one processor, for each user of the one or more users, a distance between the second feature data including the reduced number of dimensions associated with the second time period after the first time period for that user of the one or more users and each center point of each group that was segmented based on only the first feature data, without segmenting the plurality of users into the plurality of groups based on the second feature data;
   assigning, with the at least one processor, each user of the one or more users to a group of the plurality of groups based on the distance between the second feature data for that user of the one or more users and each center point of each group that was segmented based on only the first feature data;
   receiving, with the at least one processor, transaction data associated with a transaction between a merchant system in the transaction processing network and the one or more users;
   detecting, with the at least one processor, based on a connection between the one or more users in a first group of the plurality of groups for the first time period to a second group of the plurality of groups for the second time period, a trend in transactions of the one or more users for use in real-time modification of the transaction to account for user movement across the first group and the second group; and
   modifying, with the at least one processor, during processing of the transaction in the transaction processing network, the transaction based on the trend in the transactions of the one or more users, by automatically transmitting information associated with an account of the one or more users to a database to flag the account as associated with fraudulent activity, automatically suspending the processing of the transaction in the transaction processing network by canceling the transaction between the merchant system and the one or more users, and automatically suspending access of the account to the transaction service provider system in the transaction processing network.

2. The method of claim 1, wherein segmenting the plurality of users into the plurality of groups based on the first feature data comprises applying k-means clustering to the first feature data.

3. The method of claim 1, wherein a number of segments into which the plurality of users is to be segmented is a predetermined number of segments.

4. The method of claim 1, wherein the first time period is a first year, and wherein the second time period is a second year.

5. The method of claim 1, wherein each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

6. A computing system comprising:
one or more processors in a transaction service provider system in a transaction processing network programmed and/or configured to:
obtain first feature data for a plurality of users, wherein the first feature data is associated with a first time period;
apply an auto encoder neural network to the first feature data to reduce a number of dimensions of the first feature data;
segment the plurality of users into a plurality of groups based on only the first feature data including the reduced number of dimensions;
identify a center point of each group that was segmented based on only the first feature data;
obtain second feature data for one or more users of the plurality of users, wherein the second feature data is associated with a second time period entirely after the first time period;
apply the auto encoder neural network to the second feature data to reduce a number of dimensions of the second feature data to a same number of dimensions as the reduced first feature data;
determine, for each user of the one or more users, a distance between the second feature data including the reduced number of dimensions associated with the second time period after the first time period for that user of the one or more users and each center point of each group that was segmented based on only the first feature data, without segmenting the plurality of users into the plurality of groups based on the second feature data;
assign each user of the one or more users to a group of the plurality of groups based on the distance between the second feature data for that user of the one or more users and each center point of each group that was segmented based on only the first feature data;
receive transaction data associated with a transaction between a merchant system in the transaction processing network and the one or more users;
detect, based on a connection between the one or more users in a first group of the plurality of groups for the first time period to a second group of the plurality of groups for the second time period, a trend in transactions of the one or more users for use in real-time modification of the transaction to account for user movement across the first group and the second group; and
modify, during processing of the transaction in the transaction processing network, the transaction based on the trend in the transactions of the one or more users, by automatically transmitting information associated with an account of the one or more users to a database to flag the account as associated with fraudulent activity, automatically suspending the processing of the transaction in the transaction processing network by canceling the transaction between the merchant system and the one or more users, and automatically suspending access of the account to the transaction service provider system in the transaction processing network.

7. The computing system of claim 6, wherein the plurality of users is segmented into the plurality of groups based on the first feature data by applying k-means clustering to the first feature data.

8. The computing system of claim 6, wherein a number of segments into which the plurality of users is to be segmented is a predetermined number of segments.

9. The computing system of claim 6, wherein the first time period is a first year, and wherein the second time period is a second year.

10. The computing system of claim 6, wherein each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

11. A computer program product comprising at least one non-transitory computer-readable medium including program instructions that, when executed by at least one processor in a transaction service provider system in a transaction processing network, cause the at least one processor to:
obtain first feature data for a plurality of users, wherein the first feature data is associated with a first time period;
apply an auto encoder neural network to the first feature data to reduce a number of dimensions of the first feature data;
segment the plurality of users into a plurality of groups based on only the first feature data including the reduced number of dimensions;
identify a center point of each group that was segmented based on only the first feature data;
obtain second feature data for one or more users of the plurality of users, wherein the second feature data is associated with a second time period entirely after the first time period;
apply the auto encoder neural network to the second feature data to reduce a number of dimensions of the second feature data to a same number of dimensions as the reduced first feature data;
determine, for each user of the one or more users, a distance between the second feature data including the reduced number of dimensions associated with the second time period after the first time period for that user of the one or more users and each center point of each group that was segmented based on only the first feature data, without segmenting the plurality of users into the plurality of groups based on the second feature data;

assign each user of the one or more users to a group of the plurality of groups based on the distance between the second feature data for that user of the one or more users and each center point of each group that was segmented based on only the first feature data;

receive transaction data associated with a transaction between a merchant system in the transaction processing network and the one or more users;

detect, based on a connection between the one or more users in a first group of the plurality of groups for the first time period to a second group of the plurality of groups for the second time period, a trend in transactions of the one or more users for use in real-time modification of the transaction to account for user movement across the first group and the second group; and modify, during processing of the transaction in the transaction processing network, the transaction based on the trend in the transactions of the one or more users, by automatically transmitting information associated with an account of the one or more users to a database to flag the account as associated with fraudulent activity, automatically suspending the processing of the transaction in the transaction processing network by canceling the transaction between the merchant system and the one or more users, and automatically suspending access of the account to the transaction service provider system in the transaction processing network.

12. The computer program product of claim 11, wherein the plurality of users is segmented into the plurality of groups based on the first feature data by applying k-means clustering to the first feature data.

13. The computer program product of claim 11, wherein the first time period is a first year, and wherein the second time period is a second year.

14. The computer program product of claim 11, wherein each of the first feature data and the second feature data include at least one of the following features: an amount of e-commerce transactions, an amount of restaurant transactions, an amount of apparel and/or accessories transactions, an amount of transactions associated with a predetermined geographic location, a number of transactions associated with a predetermined merchant, or any combination thereof.

* * * * *